United States Patent
Brey et al.

(10) Patent No.: US 7,437,447 B2
(45) Date of Patent: Oct. 14, 2008

(54) METHOD AND SYSTEM FOR AUTHENTICATING A REQUESTOR WITHOUT PROVIDING A KEY

(75) Inventors: Thomas M. Brey, Cary, NC (US); Giles R. Frazier, Austin, TX (US); Gregory F. Pfister, Austin, TX (US); William J. Rooney, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 10/987,280

(22) Filed: Nov. 12, 2004

(65) Prior Publication Data

US 2006/0117103 A1 Jun. 1, 2006

(51) Int. Cl.
*G06F 15/16* (2006.01)
(52) U.S. Cl. .................. 709/223; 709/224; 709/225; 709/226; 380/228; 380/229; 713/171; 726/17; 726/21
(58) Field of Classification Search .......... 709/223, 709/224, 225, 226; 380/228, 229; 713/171; 726/17, 21
See application file for complete search history.

(56) References Cited

U.S. PATENT DOCUMENTS

| | | | |
|---|---|---|---|
| 5,557,678 A * | 9/1996 | Ganesan | 380/282 |
| 6,457,129 B2 | 9/2002 | O'Mahony | 713/200 |
| 6,766,353 B1 * | 7/2004 | Lin et al. | 709/203 |
| 6,813,501 B2 * | 11/2004 | Kinnunen et al. | 455/456.2 |
| 6,842,523 B1 * | 1/2005 | Niwa et al. | 380/286 |
| 2003/0097589 A1 | 5/2003 | Syvanne | 713/201 |
| 2003/0163731 A1 | 8/2003 | Wigley et al. | 713/201 |
| 2003/0217137 A1 | 11/2003 | Roese et al. | 709/223 |
| 2004/0059914 A1 | 3/2004 | Karaoguz | 713/168 |
| 2004/0088578 A1 | 5/2004 | Chao et al. | |
| 2004/0111640 A1 | 6/2004 | Baum | |

OTHER PUBLICATIONS

U.S. Appl. No. 10/702,179, filed Nov. 5, 2003 re: T. Brey et al.

* cited by examiner

*Primary Examiner*—Jinsong Hu
(74) *Attorney, Agent, or Firm*—Cantor Colburn LLP; Geraldine Monteleone

(57) ABSTRACT

A method for authenticating a requesting entity in a communications environment. In an exemplary embodiment, the method includes determining a client identification of a client node associated with the requesting entity, and determining whether the requesting entity associated with the client node is acting in a supervisor capacity. A key to the requesting entity is returned from a resource provider node upon determining that the client identification of the client node indicates that the client node is permitted to access one or more resources of the provider node, and that the client node is acting in a supervisor capacity.

4 Claims, 4 Drawing Sheets

METHOD AND SYSTEM FOR AUTHENTICATING A REQUESTOR WITHOUT PROVIDING A KEY

BACKGROUND

The present invention relates generally to managing resources within a communications environment, and, more particularly, to a method and system for authenticating a requestor without providing a key.

In one embodiment, a communications environment includes a plurality of client nodes coupled to one or more nodes via a communications medium. One example of such as communications medium is the InfiniBand™ transport, which is described in further detail in "InfiniBand Architecture Specification Volume 1," Release 1.2, October, 2004, available from the InfiniBand Trade Association at 5440 SW Westgate Drive, Suite 217, Portland, Oreg., 97221, or online at www.Infinibandta.org, which is hereby incorporated herein by reference in its entirety. InfiniBand is a trademark of the InfiniBand Trade Association.

The InfiniBand transport enables a set of interconnected client and server nodes, referred to as a subnet, to communicate with one another. It also provides a partitioning scheme that allows a subnet to be logically subdivided into sets of nodes, referred to as partitions. A partition includes one or more client nodes, as well as one or more server nodes. A node, such as a server node, can be included in more than one partition. The members of a partition communicate with one another, but are unaware of any other partition.

Within an InfiniBand™ (IB) fabric, resource provider nodes that may be shared by various client nodes are partitioned by a network administrator such that each client node is allowed to use all of the resources at the shared node. Thus, when a node (e.g., a server node) is included in multiple partitions, all of the resources of that node are accessible by all of the partitions that include that node. When a resource provider node receives a request from a client node, it provides access to all of the resources that the client node is allowed to use regardless of the application within the client node from which the request came. However, this accessibility is undesirable (e.g., from a security standpoint) when there is a need to restrict the resources that each application can use to a subset of the client's full resources. Thus, a need exists for a capability that restricts the resources that each application on a given client node is allowed to use. In Attorney Docket Number POU9-2004-0157US1, filed concurrently herewith, a capability is disclosed in which the resource allocations of a client node's applications may be dynamically changed without the need for human interaction, such that system operations may continue uninterrupted.

In an original version of such capability, a 64-bit or an arbitrarily long binary key is entered at the provider node (e.g., a storage device), and then again at the client node (e.g., a host operating system). However, this authentication approach can be time consuming, as well as error prone. Thus, it would be desirable to enable a customer to implement the definition at the resource provider node, and allow the client (identified in the InfiniBand architecture by a unique hardware value) to obtain binary keys so authorized from a key provider node, without the need to provide a key (or password) in the request from the client to the key provider node itself. This in turn would eliminate the requirement to reenter the key at the client, as well as avoid any errors associated with incorrectly entering that key.

SUMMARY

The foregoing discussed drawbacks and deficiencies of the prior art are overcome or alleviated by a method for authenticating a requesting entity in a communications environment. In an exemplary embodiment, the method includes determining a client identification of a client node associated with the requesting entity, and determining whether the requesting entity associated with the client node is acting in a supervisor capacity. A key to the requesting entity is returned from a provider node upon determining that the client identification of the client node indicates that the client node is permitted to access one or more resources of the provider node, and that the client node is acting in a supervisor capacity.

In another embodiment, a system for authenticating a requesting entity in a communications environment includes a means for determining a client identification of a client node associated with the requesting entity, and a means for determining whether the requesting entity associated with the client node is acting in a supervisor capacity. A resource provider node is configured to return a key to the requesting entity upon a determination that the client identification of the client node indicates that the client node is permitted to access one or more resources of the provider node, and that the client node is acting in a supervisor capacity.

In still another embodiment, a storage medium includes a machine readable computer program code for authenticating a requesting entity in a communications environment, and instructions for causing a computer to implement a method. The method includes determining a client identification of a client node associated with the requesting entity, and determining whether the requesting entity associated with the client node is acting in a supervisor capacity. A key to the requesting entity is returned from a resource provider node upon determining that the client identification of the client node indicates that the client node is permitted to access one or more resources of the provider node, and that the client node is acting in a supervisor capacity.

BRIEF DESCRIPTION OF THE DRAWINGS

Referring to the exemplary drawings wherein like elements are numbered alike in the several Figures.

DETAILED DESCRIPTION

Disclosed herein is a method and system for authenticating a requestor in an environment in which a client is allowed to request a set of keys that will provide access to resources within a communications medium such as InfiniBand. In order to properly authenticate the requestor and return the requested key information, certain conditions are satisfied beforehand. First, the request is associated with a predetermined client identification (ID) so as to verify that the requestor has not spoofed its physical node identifier. For example, in InfiniBand, the client ID is a globally unique identifier (GUID), typically associated with a unique piece of hardware. Then, it is further determined whether or not the request has come from supervisor state code executing on that node. If both the requestor's node client ID and supervisor state conditions are satisfied, then a key or set of keys is returned to the node, which key(s) may be used on subsequent calls so that this verification sequence is not needed for those future calls.

Briefly stated, the embodiments presented herein describe a methodology that is used to determine the physical node from which a request was sent, and to which keys may be returned. In an exemplary embodiment, the methodology may be applicable to resource provider nodes that have the ability to provide a different set of services, resources or private data to each client node that makes a request to the resource provider node. It may also be used in any situation in which it is necessary to determine the identification of a remote node that sends a packet containing the remote node's source local ID (SLID) without the possibility of being spoofed.

Furthermore, a significantly simpler authentication mechanism is provided to authenticate a supervisor as the sender of a request for private information. In so doing, the complexity and computing overhead of certificate exchange mechanisms is eliminated. When implemented in an InfiniBand network, the present methodology eliminates the need to manually query the Network Administrator to determine the set of keys needed for the client node to access resources within the resource provider node. These keys are provided to both the requesting node and the resource provider during configuration, and a key is included within request packets to the resource provider. The resource providers use the key provided in the clients' request to uniquely identify a client node, and thereby identify the resources that the requesting client is allowed to use. An exemplary size of the key is 128 bits, although it may be made as long or short as needed in order to ensure that it is unguessable. Thus, the invention embodiments described herein provide a method of securely passing private data to a requester, without the need to configure both ends of the exchange with an arbitrarily long binary key, or other type of password, which is both time consuming and error prone.

Determining Client ID of Requester

Figure 1:
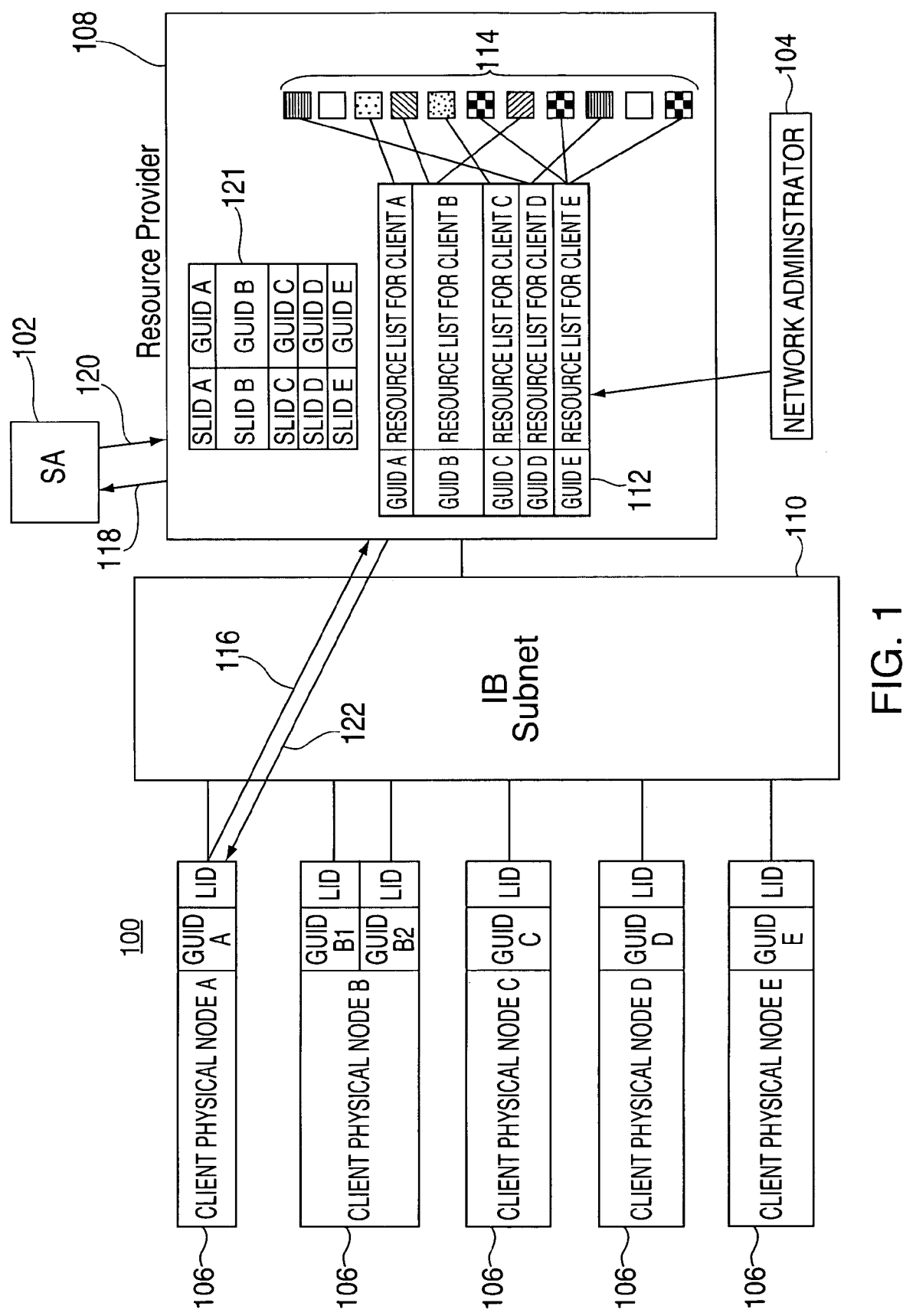
FIG. 1 is a schematic block diagram of an exemplary communications environment (e.g., subnet) suitable for use in accordance with an embodiment of the invention.

Referring initially to FIG. 1, there is shown a schematic block diagram of an exemplary communications environment 100 (e.g., subnet) suitable for use in accordance with an embodiment of the invention. Although the methodology discussed herein may be used in any situation that requires the identification of the client node from which a packet (request) is received, it is particularly suitable when a request for information is received by a resource provider whose resources have been partitioned in accordance with the manner disclosed in Attorney Docket Number POU9-2004-0157US1, filed concurrently herewith.

In such a framework, the request contains a header that includes the SLID of the requester and a payload describing the request. Although the SLID is generated by trusted hardware, it is only a temporary identifier. In order to determine actual node from which the request came, the resource provider first determines the permanent identifier associated with the physical node of the requester, referred to as the globally unique identifier (GUID) of the requester. Upon receipt of the request and before responding to that request, the IB Service or resource provider determines the GUID of the requesting node by sending a new request to the Subnet Administrator (SA). Since the SA is aware of all assignment of SLIDs to physical nodes, it will respond with the set of GUIDs corresponding to any given SLID.

The request, which contains the SLID of the client node, requests the SA to return the GUID corresponding to the SLID sent in the request. In response to the request, the SA returns the GUID (or GUIDs) of the node to which the SLID is currently assigned. After receiving the response from the SA and thus determining the GUID of the requester, the resource provider can determine if the requesting client is allowed to access the resource. If the resource is allowed to be used by the node identified by the GUID returned from the SA, then the server node will allow the use of the resource by the requesting node.

As is shown in FIG. 1, the exemplary configuration includes a subnet administrator (SA) 102, a network administrator 104, individual client nodes 106 (labeled Client Physical Node A-E), and a shared resource provider node 108. All of the nodes are interconnected by the IB Subnet 110. In one possible implementation, the network administrator 104 configures the resource provider 108 with a table 112 containing the node GUIDs of each client node, as well as the corresponding resources 114 allowed to be accessed or used by the nodes. In the example depicted, nodes A and C are permitted to access a single resource (out of the group of resources 114), nodes B and D are permitted to access two of the resources, while node E is permitted to access three resources by associating each resource to a GUID. The resource(s) associated with that GUID may be supervisor or resource keys (as further described in Attorney Docket Number POU9-2004-0157US1).

After initial configuration of the communications environment 100, a client node (e.g., Client Physical Node A) sends a request 116, in which the request packet header contains the SLID of the requester. Upon receipt of the request 116 and before responding, the resource provider 108 determines requester's GUID by sending a query 118 to the SA 102 containing the requester's SLID. In turn, the SA 102 sends a response 120 with the GUID(s) associated with the requester's SLID.

Alternatively, the resource provider 108 could also construct and maintain a table 121 of client SLIDs and their corresponding GUIDs that the resource provider had previously determined. In other words, whenever the resource provider 108 queries the SA 102 to determine the GUID corresponding to a SLID from a request packet, it then adds this information to a table of SLID to GUID mappings. Upon receipt of a subsequent request with a known SLID, the resource provider 108 determines the corresponding GUID from its local table 121, thus removing the need to query the SA. However, it should be understood that in this case the resource provider 108 would need the capability of recognizing any change in the SLID of any of its clients. Because it is not always possible to guarantee this capability, the use of resource provider 108 to maintain SLID to GUID information is preferably not implemented unless the change capability can be guaranteed.

After further determining that the request 116 was sent by the supervisor of the client node 106 (discussed below), the resource provider 108 may then determine the resources/private data the requester is authorized to use, and return such resources/private data via response 122.

Assuring Requestor is Supervisor

In addition to determining the physical client ID of a requesting entity, there is still the specific task of determining whether the requestor at a certain client node is actually a supervisor as opposed to, for example, an application running on the client node. In the InfiniBand communication network example presented, there are mechanisms by which end nodes communicate with one other within the IB fabric. In accordance with the IB architecture, nodes exchange Q_Keys during communication establishment. The receipt of a packet with a different Q_Key than the one the node provided to the remote queue pair means that packet is not valid and is thus rejected.

There are two general types of Q_Keys in the IB architecture, privileged and non-privileged. Per the IB architecture, Q_Keys with the most significant bit set are privileged Q_Keys whose use is controlled by the operating system. The principal distinction between privileged and non-privileged Q_Keys is that non-privileged Q_Keys may be attached to messages by user-mode programs by several means. However, the InfiniBand architecture requires that only code running in privileged state (i.e., a supervisor) can cause privileged Q_Keys to be attached to messages. This is enforced by making the operation of associating a Q_Key with a Queue Pair be a privileged operation, when and only when the Q_Key so associated is a privileged Q_Key. Once that association is made, any message sent from the Queue Pair will have that Q_Key attached (unless overridden on for a specific message with a non-privileged Q_Key). There is no other way to attach a privileged Q_Key to a message; thus if a message contains a privileged Q_Key, it is guaranteed that either: (a) the supervisor sent the message, or (b) the supervisor allowed the message to be sent by setting a Queue Pair's Q_Key to a privileged Q_Key, and then allowed user-mode code to use that Queue Pair.

In addition, there is a single well-known Q_Key called the Well-Known Privileged_Key (WKPQ_Key). IB managers, agents and services currently establish connections by sending a connection request containing the WKPQ_Key value, which is documented in the IB specifications. However, the usage of the WKPQ_Key is not restricted to the supervisor, since the IB managers, agents, and services running in either supervisor or application state may also be allowed to use it. These are an instance, as discussed above, of the supervisor setting a Queue Pair's Q_Key to a privileged value, and then allowing the user mode code to use that Queue Pair. Consequently, a connection request containing the current WKPQ_Key is inadequate to authenticate that the connection request came from a supervisor.

Therefore, to address this identification issue, a new privileged Q_Key is defined, and referred to herein as a Supervisor-Only Privileged QKey (SOPQ_Key). The use of this SOPQ_Key value in a connection request is permitted only by supervisors or their trusted agents and, as such, the establishment of a connection using the SOPQ_Key affirmatively indicates that the connection is being made by the supervisor of the node that sent the request. This correspondingly enables the receiver of the connection request to determine that the request came from a supervisor by verifying that the connection request contains the SOPQ_Key value. If the request does not contain the SOPQ_Key value, the connection request recipient will refuse the connection, and, consequently refuse to provide any private information.

Because the supervisor on the requesting node restricts the use of the Queue Pairs using the SOPQ_Key to the supervisor itself and its trusted agents, client applications residing on the same node as the supervisor cannot send connection requests containing the SOPQ_Key. The supervisor can so restrict this use because the SOPQ_Key is a privileged Q_Key, and therefore, as explained above, only the supervisor can associate the SOPQ_Key with a Queue Pair. This process enables a node that receives a connection request containing the SOPQ_Key to be certain that the request came did in fact come from a supervisor, and that requests for privileged resources may be accepted on the connection.

One practical use for implementing the above described node client ID and supervisor verification protocols lies in the distribution of private information such as supervisor and resource keys. A supervisor or resource key is a sequence of digits arbitrarily long enough to be unguessable. Each resource on the IB fabric that can be shared by multiple nodes may be associated with a set of one or more resource keys, wherein each resource key corresponds to resource(s) that a given node is permitted to access or consume. In order to use the shared resource, the supervisor of each node must acquire a resource key in order to obtain access to its portion of resources in the provider node. In order to distribute the resource keys, a key service is provided for distributing the resource keys to the appropriate supervisors upon request. To verify that a request to the key service came from a supervisor, therefore, the key service accepts the request only if it contains the SOPQ_Key. This process prevents all applications except the supervisor or its trusted agents from obtaining resource keys from the key service. The key service may or may not be on the same node as the resource provider.

Figure 2:
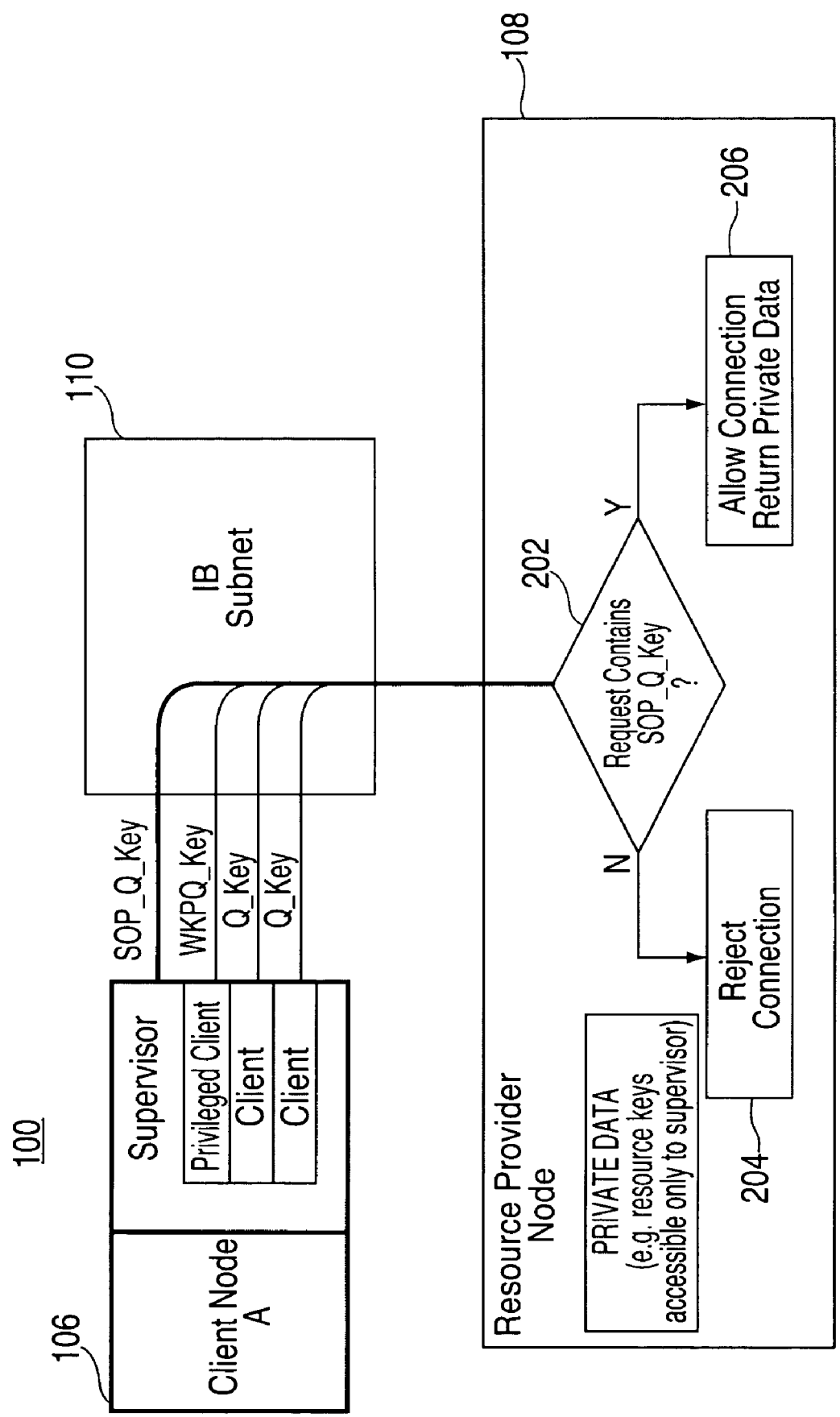
FIG. 2 is a schematic diagram that illustrates an exemplary implementation of determining a requesting entity is running in supervisor (or hypervisor) mode or has supervisor or hypervisor privileges for the communications environment of FIG. 1.

FIG. 2 illustrates the implementation of the SOPQ_Key for the communications environment 100 of FIG. 1. In particular, FIG. 2 depicts four connection requests from client node A: one from the supervisor thereof containing the SOPQ_Key, one from a privileged client which contains the WKPQ_key, and two from non-privileged clients containing a non-privileged Q_Key. Upon receipt of these requests, the resource provider node 108 examines the Q_Keys contained in each request, as shown in block 202. If the request does not contain the SOPQ_Key, it is rejected by the resource provider node 108 as shown in block 204. However, if the request does contain the SOPQ_Key, it is accepted and the resource provider node 108 allows a connection to take place where private data (such as a key) is returned to the client node 106, as shown in block 206.

Thus configured, the resource provider node 108 permits a connection only where the request came from the supervisor of a client node, thereby ensuring that private data is not distributed to any process that is not a supervisor. It will be noted that any process that has been authorized by the supervisor to use the SOPQ_Key is considered part of the supervisor. Accordingly, by defining the SOPQ_Key and allowing this to be used only by a supervisor, the need for time-consuming supervisor authentication processes (e.g., the exchange of certificate data) is eliminated, thereby improving system performance, decreasing complexity and cost.

Providing Key(s) for Subsequent Calls

Figure 3:
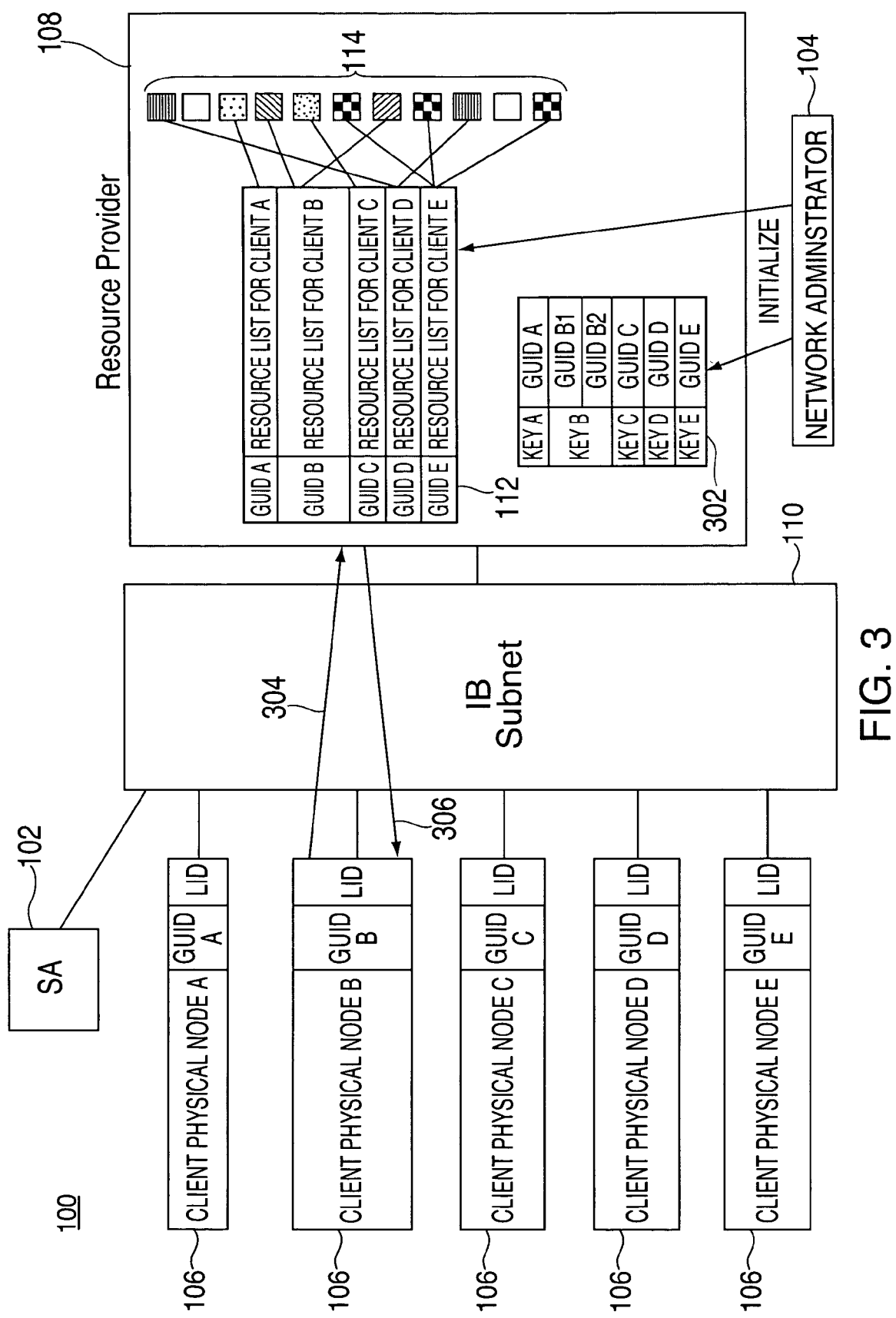
FIG. 3 is a schematic block diagram illustrating the configuration of the resource provider node with a table containing the GUIDs of each client node, and a table containing the corresponding resources authorized to be used.

Referring now to FIG. 3, there is shown another schematic block diagram of the exemplary communications environment 100, in which the network administrator is shown configuring the resource provider node 108 with a table 302 containing the GUIDs and key mapping of each client node 106, and the table 112 containing the corresponding resources 114 authorized to be used, as was shown in FIG. 1. The network administrator 104 or some other trusted entity associates a key with each client as also shown in table 302. The resource provider node 108 uses tables 302 and 112 during normal operations upon receiving requests from various clients as described below.

During normal operation, each client node 106 includes its corresponding key in all connection requests to the resource provider node 108. When the resource provider node 108 receives the request, it determines the resources that the client node 106 is allowed to use by examining the tables 302, 112 (formed during the configuration step) to identify the resources corresponding to the key received in the request. For example, if Client Node B sends a request 304, then the request 304 contains Client Node B's key, which is represented as "Key B" in table 302.

Upon receipt of this request, the resource provider node 108 uses table 302 to determine the GUID of Client Node B, and further uses table 112 to determine the allowed resources associated with the client node having GUID B. A connection response 306 is then sent from the resource provider node 108 to Client Node B. This procedure eliminates the need for the resource provider node 108 to access the SA 102 in order to determine the resources Client Node B is allowed to use each time a connection to the resource provider 108 is made, as explained above. The elimination of the need to access the SA 102 improves performance significantly, since each SA access requires a lookup operation on the SA and thus round-trip delay multiplied by many resource provider nodes querying the SA, which also decreases the utilization of the SA, thereby allowing the SA to process other transactions more efficiently.

Such requests, which originate from clients to resource providers, may simply be independent requests for usage of a resource, or they may also be connection requests and responses between the client node and resource provider node. If a connection is formed between the client node and resource provider node, then the client is allowed to use all resources corresponding to the resource key contained in the connection request during the duration of the connection, without the need to pass the resource key in each subsequent request.

Still a further additional aspect of the present invention embodiments involves updating a resource key. If the resource keys need to be updated after having been transferred to the resource provider node, the trusted administrator 104 may send a list of GUIDs and their corresponding keys to the resource provider node 108. The list of resources associated with each GUID need not be resent, however. With respect to FIG. 3, such an operation would be implemented by updating table 302 in the resource provider without affecting table 112.

It should be recognized that although the above described exemplary embodiments of the invention use tables 302 and 112 that contain the GUIDs of the requesting client nodes, use of a GUID is not needed. For example, an alternative embodiment would eliminate the use of GUIDs and simply associate keys directly with allowed resource lists or other parameters, thus effectively merging tables 302 and 112 into a single table. Such an alternative would be applicable in situations wherein the administrator assigned resources, not on a GUID basis, but based on another identifier such as a globally unique software identifier.

Figure 4:
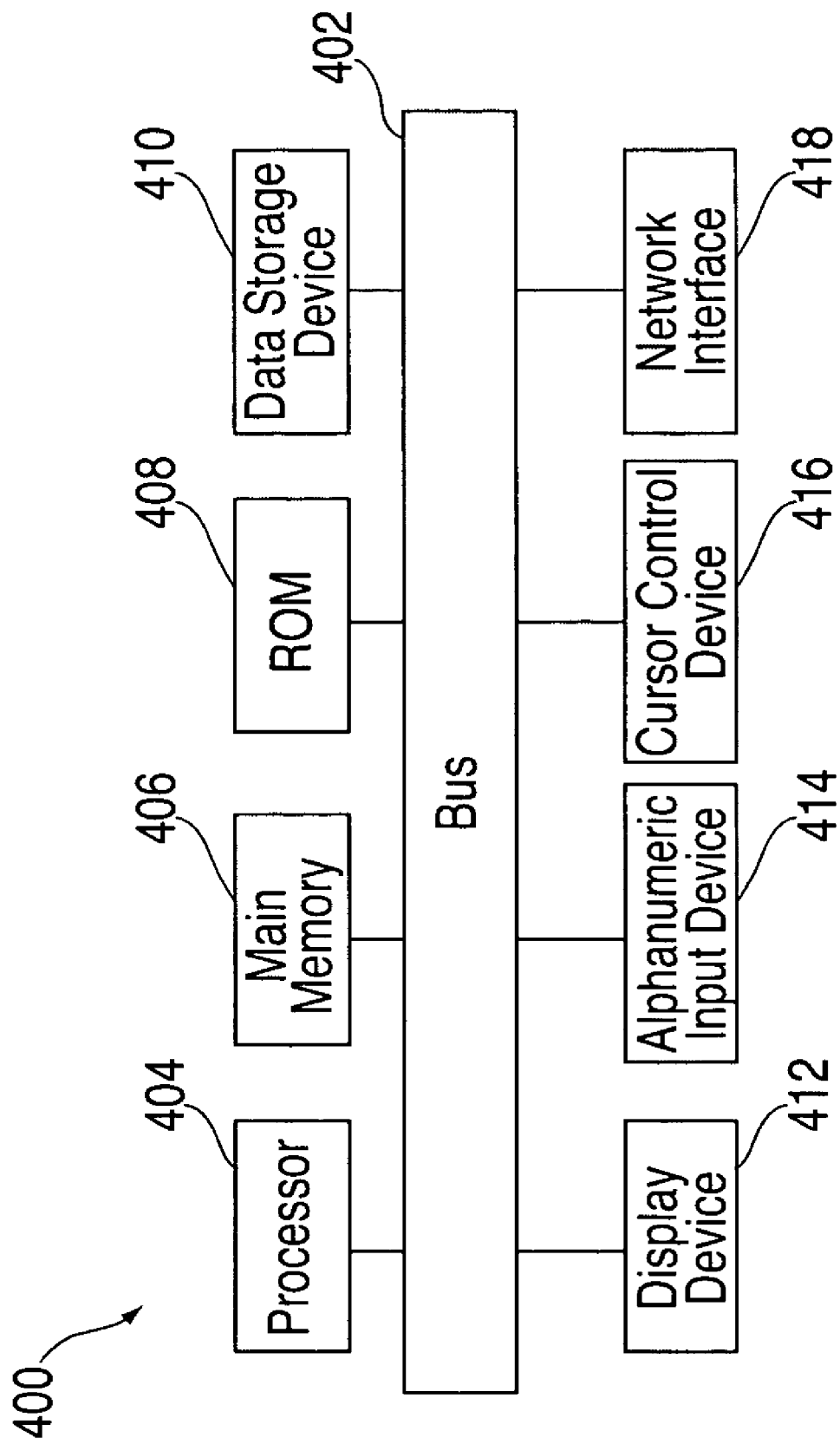
FIG. 4 is an exemplary computing system in which the supervisor partitioning scheme may be implemented.

Finally, FIG. 4 is a block diagram of an embodiment of an exemplary computer system 400 in which the above described request authentication a scheme may be implemented. The computer system 400 illustrated in FIG. 4 is intended to represent a broad range of computer systems, and thus alternative computer systems may include more, fewer and/or different components.

As shown in FIG. 4, the computer system 400 includes a bus 402 or other communication device to communicate information, as well as a processor 404 coupled to the bus 402 to process information. Although the computer system 400 is illustrated with a single processor, multiple processors and/or co-processors may also be included.

A random access memory (RAM) or other type of dynamic storage device 406 (depicted as main memory in FIG. 4) is coupled to the bus 402 to store information and instructions to be executed by processor 404. The main memory 406 may also be used to store temporary variables or other intermediate information during execution of instructions by the processor 404. A read only memory (ROM) and/or other static data storage device 408 is also shown coupled to bus 402 for storing static information and other instructions carried out by processor 404, while data storage device 410 (e.g., a magnetic disk or optical disc and corresponding drive) is coupled to bus 402 for storing information and instructions.

The computer system 400 may also be coupled via the bus 402 to a display device 412, such as a cathode ray tube (CRT) or liquid crystal display (LCD), for displaying information to a computer user. An alphanumeric input device 414, including alphanumeric and other keys, may be coupled to the bus 402 to allow a user to communicate information and command selections to the processor 404. Another type of user input device that may be associated with computer system 400 is a cursor control device 416, such as a mouse, a trackball, or cursor direction keys to communicate direction information and command selections to processor 404, as well as to control cursor movement on the display device 412. In addition, a network interface 418 may be used to provide access to a network, such as a local area network.

In view of the above, the present method and system embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for authenticating a requesting entity in a subnet communications environment, the method comprising:

determining a client identification of a client node associated with the requesting entity by receiving a source identifier from said requesting entity and associating said source identifier with one or more permanent identifiers of said client node, wherein said source identifier is a source logical identifier (SLID), and said one or more permanent identifiers are one or more globally unique identifiers (GUID) of said client node;

determining whether the requesting entity associated with said client node is acting in a supervisor capacity by defining a supervisor only privileged key for each client node in the communications environment, and by determining whether a connection request received from said requested entity includes said supervisor only privileged key corresponding to said client node of said requesting entity; and returning, from a resource provider node, a key to said requesting entity upon determining that said client identification of said client node indicates that said client node is permitted to access one or more resources of said provider node, and that said client node is acting in a supervisor capacity;

wherein said associating said SLID with one or more globally unique identifiers (GUID) of said client node further comprises:

forwarding said SLID to a subnet administrator; and receiving, from said subnet administrator, said one or more GUIDs corresponding to said SLID.

2. The method of claim 1, further comprising maintaining a first table within said resource provider node, said first table associating accessible resources for each of a plurality of known GUIDs.

3. The method of claim 2, further comprising maintaining a second table within said resource provider node, said second table associating GUIDs to SLIDs.

4. The method of claim 3, further comprising maintaining a third table in said resource provider node, said third table comprising an association of keys for each GUID known to said resource provider node.

\* \* \* \* \*